D. D. LITTLEJOHN.
SUBSOIL ATTACHMENT.
APPLICATION FILED NOV. 24, 1913.
1,106,312.
Patented Aug. 4, 1914.
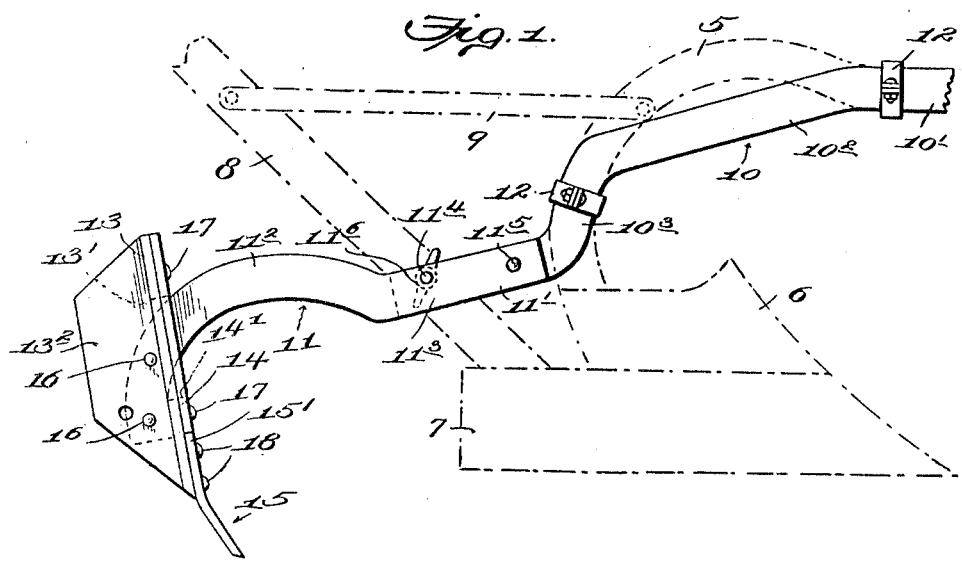
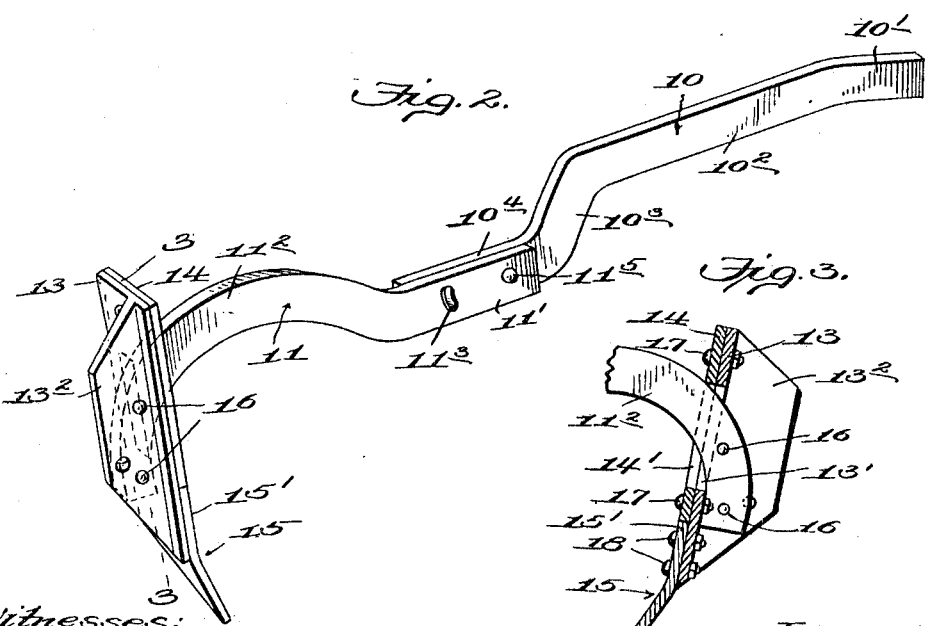
Witnesses:
Inventor
Demetrius D. Littlejohn
by
Attorney.

UNITED STATES PATENT OFFICE.

DEMETRIUS D. LITTLEJOHN, OF STATESVILLE, NORTH CAROLINA.

SUBSOIL ATTACHMENT.

1,106,312.  Specification of Letters Patent.  Patented Aug. 4, 1914.

Application filed November 24, 1913. Serial No. 802,775.

*To all whom it may concern:*

Be it known that I, DEMETRIUS D. LITTLE-JOHN, a citizen of the United States, residing at Statesville, in the county of Iredell and State of North Carolina, have invented new and useful Improvements in Subsoil Attachments, of which the following is a specification.

The present invention has reference to subsoil attachments, and it proposes, briefly, an improved device of the general character indicated which may be readily applied to any of the conventional makes of "gooseneck" plow, and which is so constructed and arranged as to permit an adjustment of one of the two component parts of its support or bar relative to the other, for the purpose of regulating the working depth of the ground-treating implement. It further proposes an improved, two-part adjustable support, which is so shaped as to offer no projecting portions or the like whereon grass, weeds, and other trash may catch and hang during the movement of the plow, and to which the ground-treating implement may be readily applied, and it finally proposes a support of this type which may be used interchangeably on both right- and left-hand plows without affecting the desired central position of the afore-mentioned implement.

An embodiment of the invention is illustrated in the accompanying drawing, whereof:—

Figure 1 is a side elevation of the improved attachment, as applied to the plow, the latter appearing in dotted lines; Fig. 2 is a perspective view of the attachment; and Fig. 3 is a detail vertical section taken on line 3 3, Fig. 2.

As previously stated, the plow to which the improved attachment is applied is of the ordinary "goose-neck" type, for which reason it is sufficient to state that it consists of, or is provided with, the following parts, namely: the beam 5, mold-board 6, landside 7, handles 8 and braces 9, none of such parts requiring, in itself, any extended description or illustration.

The subsoiler attachment is connected to the beam 5, and is here shown as comprising the ground-treating implement, and a support therefor. The latter element preferably consists of two parts or members 10 and 11 which are in the form of metal bars arranged, one behind the other, the front bar 10 being so shaped as to conform as nearly as possible, to the curved rear portion of the beam, to which portion it is securely fastened by suitable clips 12. To this end, the aforesaid bar 10 comprises a straight front terminal portion 10', a succeeding, downwardly-inclined body portion 10², located close to the top of the curved neck of the beam, a rear terminal portion 10⁴ arranged behind the beam and substantially parallel with the body or central portion 10³, and a second downwardly-inclined portion 10³ connecting the portions 10² and 10⁴ and arranged directly against the beam, the clips 12 engaging the portions 10' and 10³. The other bar 11 comprises a straight front portion 11', which is arranged against and in line with the portion 10⁴ of bar 10, and a curved portion 11².

The ground-treating implement is attached to the above-described support, the form of implement here shown consisting of a base 13, a face plate 14 arranged against the front thereof, and a point or analogous device 15 secured to the lower portion of the said base. The plates 13 and 14 are formed with vertical, centrally-located slots 13' and 14', and the first-named plate is also provided with a rearwardly-projecting vertical web 13² that extends from end to end thereof and is arranged at one side of slot 13'.

The two slots 13' and 14' register and are of the same size, and that face of web 13² which is adjacent said slots is flush with the corresponding walls thereof. The terminal of the portion 11² of the rear bar 11 projects through said slots and is fastened to said web by bolts or other suitable devices 16, the web being formed with a series of bolt holes to permit an adjustment of the ground-treating implement as a whole with respect thereto, as will be understood from the drawing. The length of the face plate 14 is less than that of the plate 13, and since the top edges of these two plates are arranged flush with each other, a space is left at the lower portion of the said plate 13 against which is arranged the upper portion 15' of the point, the combined length of this portion and of the plate 14 being equal to that of the plate 13. The plates 13 and 14 are secured together by bolts or other fasteners 17, and the lower portion of the former plate and the afore-mentioned portion 15' of the point by similar fasteners 18. The fasteners last referred to are removable, thereby permitting the point to be detached and sharpened and, if necessary, replaced by a new point.

The two bars 10 and 11 of which the support is composed, as previously stated, are so constructed and arranged as to permit the rear bar 11 to be adjusted relative to the front bar, this adjustment enabling the working depth of the point to be regulated according to existing conditions. In the construction illustrated the result indicated is obtained by means of an arcuate slot 11³ which is formed in the inner portion or section of one of the two complemental or companion bars and receives a lateral stud or bolt 11⁴ affixed to the corresponding portion or section of the other bar. In the present instance, the slot mentioned is formed in the front section 11′ of bar 11, while the bolt or stud 11⁴ is carried by the rear part or section 10⁴ of the front bar 10, the latter part or section being further connected to the section 11′ by a bolt 11⁵ which acts as the pivot or fulcrum about which bar 11 swings during its adjustment. Bar 11 is retained in adjusted position through the agency of a clamping nut 11⁶ which is fitted on the projecting end of bolt 11⁴ and is adapted to be tightened against the outer face of section 11′.

It will be observed from the foregoing that the front bar 10 of the support hugs the adjacent face of the beam and, also, as previously stated, that it conforms as nearly as possible to the shape of the rear portion of the beam. It is further to be noted that this bar occupies a single plane which is parallel to the adjacent face of the beam, or, in other words, the said bar has no laterally offset portions. The rear bar 11 in like manner lies entirely in a single vertical plane which is parallel to that of bar 10. By reason of this arrangement of parts, as well as to their construction, no projections are offered upon which roots, grass or other trash in the path of the plow can catch and hang, so that the discharge of earth or sod by and from the mold-board is not obstructed, and choking, in consequence, is obviated. Finally, it is to be observed that the support may be applied with equal facility to either side of the beam, or, in other words, may be used with either a right-hand plow or a left-hand plow.

Having fully described my invention, I claim:—

1. A subsoil attachment for goose-neck plows comprising a supporting bar which consists of a front member adapted to be secured to the plow beam, and a separate, vertically-adjustable rear member projecting rearwardly beyond said beam, the first-named member embodying a downwardly-inclined body part adapted for arrangement close to the top of the curved neck of the beam, a horizontal terminal part in advance of and joined to the body part, and a part in the rear of and joined to said body part, the two last-named parts being adapted for conformable arrangement directly against and attachment to the corresponding parts of said beam; and a ground-treating implement connected to the rear member of said bar.

2. A subsoil attachment for goose-neck plows comprising a supporting bar which consists of structurally-separate, front and rear members occupying a vertical plane which is substantially parallel with the plane of the plow beam, the former member embodying a horizontal, front terminal part, a succeeding, downwardly-inclined, body part joined to the rear end of said terminal part, a second downwardly-inclined part joined to the rear end of the first inclined part, and a rear terminal part joined to the lower end of the second inclined part and substantially parallel with the first inclined part, the said first inclined part being adapted for arrangement close to the top of the curved neck of the plow beam, and the said front terminal and second inclined parts for conformable arrangement directly against and attachment directly to the adjacent parts of said neck; and a ground-treating implement carried by the rear member of said bar at its rear end, the said rear member overlapping at its front end the rear terminal part of said front member and being adapted to swing in the aforesaid vertical plane relatively to that member to vary the working depth of said implement, one of said overlapping parts being provided with a transversely-disposed arcuate slot, and the other of such parts with a lateral stud projecting through said slot and having a fastener for holding the rear member in adjusted position.

In testimony whereof I have hereunto set my hand in presence of two subscribing witnesses.

DEMETRIUS D. LITTLEJOHN.

Witnesses:
H. C. McCartney,
Chas. S. Hyer.

---

Copies of this patent may be obtained for five cents each, by addressing the "Commissioner of Patents, Washington, D. C."